(No Model.)
A. BORNHOLDT.
DUPLEX PUMP.
No. 467,587. Patented Jan. 26, 1892.
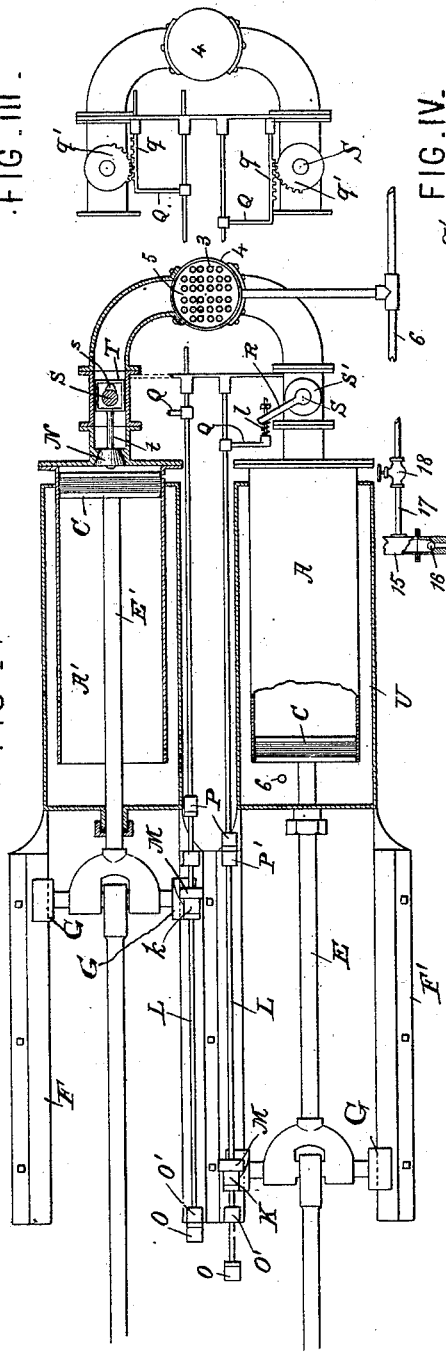
Attest:
Geo. T. Smallwood.
Jonathan Ciley.
Inventor:
Adolph Bornholdt
by Pollock Mauro
his attorneys.
THE NORRIS PETERS CO., PHOTO-LITHO., WASHINGTON, D. C.

UNITED STATES PATENT OFFICE.

ADOLPH BORNHOLDT, OF BROOKLYN, NEW YORK, ASSIGNOR OF ONE-HALF TO JOSEPH GLATZ, OF SAME PLACE.

DUPLEX PUMP.

SPECIFICATION forming part of Letters Patent No. 467,587, dated January 26, 1892.

Application filed May 21, 1891. Serial No. 393,559. (No model.)

*To all whom it may concern:*

Be it known that I, ADOLPH BORNHOLDT, a resident of Brooklyn, county of Kings, and State of New York, have invented a new and useful Improvement in Duplex Pumps, which improvement is fully set forth in the following specification.

This invention relates to the construction of vacuum-pumps for use in connection with stills or with engine-boilers as a condensing-pump, or for deep wells or for other purposes.

The general object of the invention is to produce a pump capable of maintaining a very high vacuum, and which therefore can be advantageously used for the purposes above indicated.

To this end the invention consists in the particular construction and arrangement of the vacuum-cylinder and auxiliary parts, as hereinafter particularly pointed out and claimed, whereby the cylinder is absolutely emptied of air and vapor at each forward stroke of the piston and the inlet-valve at the same time sealed against the return of any air or vapor during the period of compression. The particular construction and combination of devices whereby these results are secured can be most conveniently explained in connection with the accompanying drawings, in which—

Figure I is a horizontal section and plan view showing the valves and valve-movement and other parts applied to an indirect duplex pump. Fig. II is a side elevation, partly in section. Fig. III is a detail in plan showing a modification of the valve-movement, and Fig. IV is a vertical section showing a special form of valve.

In the drawings, A A' represent, respectively, the two pump-cylinders, C C' the two pistons, and E E' the piston-rods.

F F' are castings having dovetail guide-rails for the slides G, which are connected to the ends of the piston-rods. On each slide G is a curved arm J, supporting at its end a friction-clamp K, which may conveniently be made of a perforated block of ordinary rubber packing. Through the perforation of the block passes a valve-rod L, and the grip of the friction-clamp on the valve-rod may be tightened or loosened by means of the nut M.

The friction-clamp moves back and forth with the piston the full length of its stroke; but it is desired to give the rod only sufficient movement to operate the inlet-valve N of the pump-cylinder A or A'. Consequently the valve-rod is provided on its ends or on some other convenient part with a stop O, which when the rod has moved forward a sufficient distance strikes an abutment O' on the frame or casting, and thereafter the friction-clamp slips on the rod. Similar stops P and abutments P' limit the return movement of the valve-rod. Different means for connecting this positive actuating mechanism with the valve may be employed.

As shown in Figs. I and II, the rod L has a bent arm Q, provided with a small spiral spring $l$, which, as the rod moves forward, presses elastically upon an arm R. The latter is secured to a stud or plug S, which is set air-tight in a box S', and is capable of rotation therein. Plug S has a cam projection $s$, which, as the plug is turned by the arm Q, bears against the end of the stirrup T, connected with the valve-stem $t$, and thus closes the valve N positively. By reason of spring $l$ the valve is closed by yielding pressure, preventing injury to the mechanism.

As shown in Fig. III, the arm Q is provided with a rack $q$, which engages a pinion $q'$, which is mounted on the plug or stud S, and turns the latter positively in both directions.

It is essential to the efficient operation of the pump mechanism, as will be pointed out hereinafter, that means should be provided to open and close the inlet-valve positively. The particular actuating means just described have been found operative and efficient in action. Attempts to close the valve by devices inside the cylinder have not proved satisfactory. In the arrangement described access can be had to all parts for adjustment, and when the apparatus is out of use both valves can be closed by hand.

In Figs. I and II the cylinders A A' are shown as inclosed in the tank U, which is the receptacle for the cooling liquid, and the receiver for the matters collected by the pump when used for condensing. The inner ends of the cylinders open directly into said tank, being closed only by the piston-heads, which may be provided with packing-rings, or may have a smooth periphery, according to the use of the apparatus. The suction-pipe 2, Fig. II, leads from the still or the exhaust-pipe of the engine or other apparatus, according to the purpose for which the pump is used. The pipe 2 communicates with the condenser, which consists of a series of upright tubes 3, open at their upper ends, and an inclosing jacket 4. The spaces 5 between the tubes are closed at the top. The pipe 6 admits the condensing-liquid to the space within the jacket, and the said liquid is forced through a series of small perforations in the top of tubes 3, (see Fig. II,) so that the vapors drawn down through pipe 2 encounter the spray and are cut down or partially condensed. The pipe 6 connects, as shown, with the lower part of tank U, and when cock 7 is open and cock 8 closed the condensing medium is constantly reused. The pipe 6 is to be connected at its farther end (not shown) with some suitable source of supply for water or other condensing-liquid. When, instead of reusing the same liquid, a fresh supply is to be drawn into the condenser at each stroke of the piston, the cock 7 will be closed and cock 8 opened. The condenser communicates with the two cylinders A A', so that the distilled matters pass into said cylinders alternately. These matters may be only partially condensed, and as it is disadvantageous to have the liquid portions pass through the same valve as the vapors a pipe 9 is provided to carry the liquids. It communicates with the cylinder through a small flap-valve 10, which may be conveniently formed of a strip of rubber. Through the top wall of the cylinder are a number of small perforations 11, through which as the piston retreats a spray of liquid from tank U is discharged upon the vapors entering through valve N, which effects a further condensation. When the piston moves inward, the liquids and vapors collected in the cylinder are forced into the tank U through the discharge-valve W, which, as shown, consists simply of a soft-rubber plate, which is found in practice to give excellent results. Thus there is a constant circulation between the tank U and the condenser and back again, the same liquid being used repeatedly. It will be understood that when the pump is used as a vacuum-pump simply the condenser is not required. It therefore forms no necessary part of the apparatus. The tank U is shown as provided with an inlet-opening 13, for use, as required, to keep up the supply of liquid, and with a discharge-opening 14 to draw off its contents, when necessary. It also has a vapor discharge pipe 15, provided with a small check-valve 16. The manner of discharge will depend upon the use made of the pump. If the vapors that collect in tank U are of no value, the pipe 15 may discharge into the atmosphere. In using the apparatus to pump the exhaust-steam from an engine the pipe will return to the boiler. Just above the check-valve 16 is a small pipe 17, provided with a cock 18. The pipe 15 may be of considerable length and height, and the liquid that may collect therein will be drawn off by pipe 17.

In the operation of the pump, considering it for convenience simply as a vacuum pump, the cylinder always contains a certain quantity of liquid. As the piston moves forward the air is forced into tank U, and the level of the water (being more and more confined) gradually rises until it seals the inlet. Finally, as the piston reaches the forward limit of its stroke the air has been entirely squeezed out and the space in front of the piston is occupied wholly by the liquid. As the piston retreats, air and liquid again enter by their respective inlets. In ordinary vacuum pumps there is always a thin layer of air in front of the piston, which, being under high compression, may escape in part, and which expands as the piston retreats. This prevents obtaining a very high vacuum. By my apparatus it is possible to maintain a vacuum higher, it is believed, than has been heretofore obtained by other means. In securing this result the use of means such as indicated for actuating the inlet-valve positively and with certainty is of the utmost importance. The exhaust in the suction-pipe is so complete that there is not sufficient difference in pressure to operate the lightest kind of hanging or flap valves. On the other hand, if such a valve were used its opening and closing at the proper time would be so uncertain as to prevent obtaining the desired results.

In Fig. IV, I have shown the form of inlet-valve devised for hot fluids. No form of valves with which I am familiar gives entire satisfaction when operating with hot fluids, as the expansion of either the valve itself or its connections causes defective working. The valve shown in the drawings is found to give excellent results. It consists of a plug N', tapering slightly toward the bottom and set in an opening of corresponding shape in the valve-box, which is provided on top with a cup c for oil or similar liquid to seal the valve. The valve in its construction and operation is substantially like a two-way cock. The bottom of the valve-box is, however, closed so that the valve-stem is inclosed underneath and a free space is left between its lower end and the adjacent part of the casing. The valve, moreover, is not screwed down or otherwise held in place, except by its own weight, so that within sufficiently wide limits it is free to expand and contract vertically. It will be seen that the expansion in thickness will on account of the tapering form of the valve cause it to rise, adjusting its increased diameter to the size of the opening which contains it.

It will be obvious from the foregoing explanation that some of the improvements may be used without others, and may be embodied in a single-acting pump, and that modifications may be made in details of construction without departing from the spirit of the invention.

I do not claim herein the particular construction of the inlet-valve and its operating mechanism, as described and shown, these improvements being reserved to my divisional application filed November, 16, 1891, Serial No. 412,049.

Having now fully described my said invention, what I claim, and desire to secure by Letters Patent, is—

1. The combination of the receiving tank or vessel and the pump-cylinders opening at one end into the lower part thereof and provided at the other end with an inlet-valve and with a discharge-valve controlling communication between the cylinder and vessel, the cylinders being provided with a series of jet-openings near the inlet-valve, substantially as described.

2. The combination of the receiving tank or vessel, a pump-cylinder and piston, said cylinder having an inlet-valve, and a discharge-valve controlling communication with said vessel, the suction-pipe leading to said inlet-valve, and a pipe for liquid, leading from said tank or vessel to said suction-pipe, substantially as described.

3. The combination of the receiving tank or vessel, the pump-cylinder having inlet and outlet valves, the suction-pipe, a pipe for supplying liquid from said tank to said suction-pipe, and a branch pipe beneath the main suction-pipe conveying liquid matters to the cylinder by a separate inlet, substantially as described.

4. The combination of the receiving tank or vessel having at the top a discharge-pipe containing a check-valve, a separate pipe for liquid connected with said discharge-pipe above the check-valve, a pump-cylinder, a suction-pipe communicating therewith, a pipe for conveying liquid from the tank to the suction-pipe, an inlet-valve between the suction-pipe and cylinder, and an outlet-valve between the cylinder and tank, substantially as described.

In testimony whereof I have signed this specification in the presence of two subscribing witnesses.

ADOLPH BORNHOLDT.

Witnesses:
PHILIP MAURO,
JONATHAN CILLEY.